Jan. 11, 1927.  
W. C. ITZEN  
1,613,892  
STRAW SPREADER  
Filed April 20, 1925
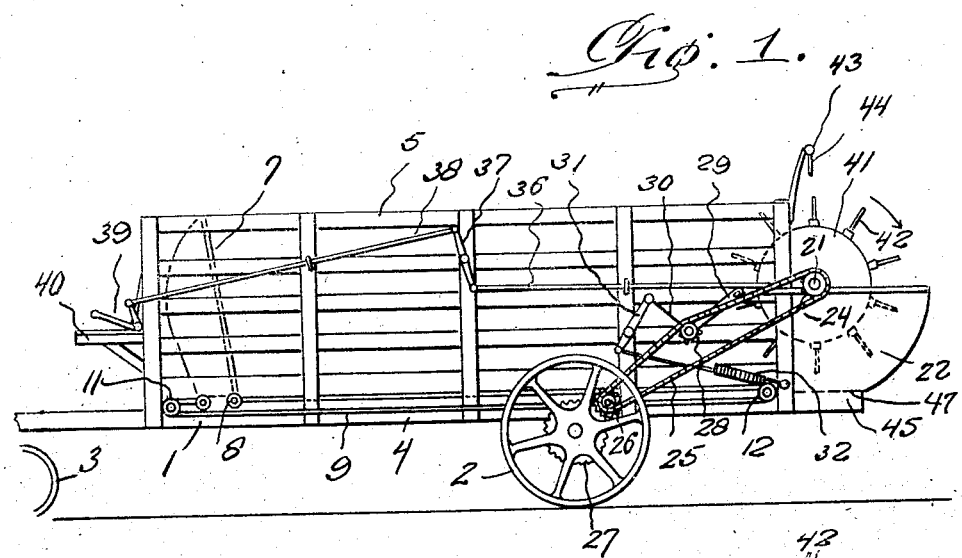
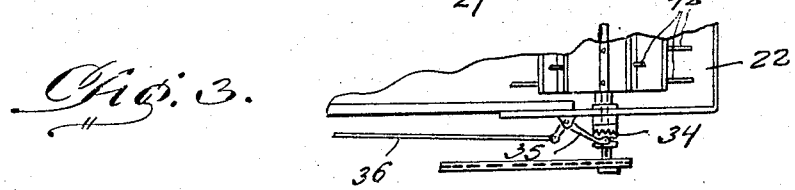
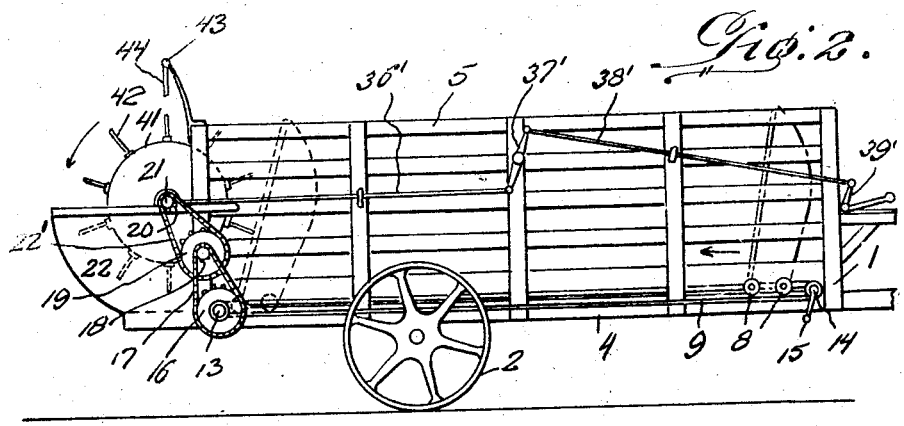
Inventor  
W. C. Itzen,  
By Clarence O'Brien  
Attorney Patented Jan. 11, 1927.

1,613,892

UNITED STATES PATENT OFFICE.

WILLIAM C. ITZEN, OF GENEVA, NEBRASKA.

STRAW SPREADER.

Application filed April 20, 1925. Serial No. 24,623.

The present invention relates to straw distributing mechanism and more particularly to a device for distributing straw or the like over the ground to conserve the moisture as well as to fertilize and prevent blowing of the soil.

The invention contemplates the provision of means for feeding the straw toward a distributing mechanism, which mechanism will scatter the straw and has associated therewith apparatus for collecting the grain from the straw.

I have also provided means whereby the beating, separating, and distributing mechanism may operate synchronously with the movement of the spreader which carries them and the straw.

I also contemplate the provision of a straw spreader of this nature which will be exceedingly simple in its construction, efficient and reliable in its operation, one which may be manufactured at a relatively low cost, and yet be strong, durable, not likely to become easily out of order, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing,

Figure 1 is an elevation showing one side of the spreader embodying the features of my invention, Figure 2 is an elevation of the other side thereof, Figure 3 is a detail top plan view showing particularly the clutch mechanism for controlling the operation of the feeding and distributing mechanism.

Referring to the drawing in detail, it will be seen that 1 designates generally the body of the spreader which is mounted on the rear wheels 2 and front wheels 3 in any desired manner. The body includes a bottom 4, and a pair of longitudinally disposed sides 5. A follower 7 is disposed in the body between the sides 5 and is mounted on rollers 8 movable over the bottom 4. A chain 9 has its ends fixed to the follower 7 and is trained over suitable sprockets 11 and 12, the latter of which is mounted on a shaft 13. It is preferable to provide two of the chains 9, one on each side of the body as will be evident from an inspection of Figures 1 and 2. The sprockets 11 are also mounted on a shaft as is indicated at 14 which may be operated by a crank 15. The shaft 13, however, is operable by a sprocket 16 over which is trained a chain 17. This chain 17 is also trained over a relatively small sprocket 18 rotatable with a relatively large sprocket 19. A sprocket 20 is mounted on a shaft 21 which is journaled across the top of the casing 22. A chain 22' is trained over the sprockets 19 and 20. On the other side of the body, a sprocket 24 is mounted on the shaft 21 and a chain 25 is trained thereover, and also over a sprocket 26 which is operable by a gear meshing with the gear 27 rotatable with one of the wheels 2. An idler sprocket 28 is journaled on the end of an arm 29 pivoted to one of the sides 5. A cable 30 is attached to the free end of the arm 29 at one end, and at its other end is attached to a lever 31 pivoted intermediate its ends to the side 5. A spring 32 is attached at one end to one side 5, and at its other end to the lower end of the lever 31, and thereby swings the free end of the arm 29 upwardly so that the sprocket 28 will properly tension the chain 25.

The shaft 21 is formed in sections, having associated therewith a clutch mechanism 34 controlled by a lever 35 pivoted on the side of the casing 22. This lever 25 is actuatable by a rod 36 which is operated by the lever 37 pivoted on one side 5. A rod 38 controls the lever 35 and in turn is controlled by a lever 39 on the platform 40 at the front end of the body. A distributing cylinder 41 is mounted on the shaft 21 and has a plurality of radiating teeth 42 extending therefrom for operation in the casing 22. A stripper 43 is mounted on the rear of the body above the cylinder 41 and has depending teeth 44 for cooperating with the teeth 42. The cylinder 41 rotates in the direction indicated by the arrows, that is in a direction opposite to the rotation of the wheels 2 when the spreader is moving forwardly. A grain pan 45 is formed in the bottom of the casing 22, and catches the grain knocked from the straw and will preferably have a perforated or screen covering therefor. In order to provide the grain pan 45 at the bottom of the casing 22, this casing is formed with an open top across which extends the feeder cylinder 41 and the side walls of the casing have straight upper and lower edges and downwardly and forwardly curved rear edges, each terminating in an angular offset depending portion, while the rear wall is curved downwardly and forwardly and terminates at its lower edge in an angular offset depending flange, the bottom of the casing is formed rectangular to provide with the offset parts a grain pan. A screen 47 is interposed between the grain pan and the casing proper as is indicated in dotted lines in Fig. 1.

It will thus be seen that as the spreader is moving forwardly, and the clutch 34 is engaged that the shaft 21 will be rotated, thereby causing the slow movement of the follower 7 rearwardly toward the distributing cylinder 41 and simultaneously the cylinder 41 will be rotating at a relatively great rate of speed for scattering or distributing the straw which is being fed thereto by the follower 7. The construction, operation, and advantages of the invention should now be clearly understood without a more detailed description. The present embodiment of the invention, of course, has been disclosed merely by way of example and attains all the features of advantage enumerated as desirable in the statement of the invention and the above description. It is apparent, however, that numerous changes in the details of construction, and in the combination and arrangement of parts may be resorted to without departing from the spirit or scope of the invention as hereinafter claimed or sacrificing any of its advantages.

It is preferable to provide rod 36', lever 37', rod 38' and lever 39' similar to corresponding elements 36, 37, 38, and 39, for operation of a clutch mechanism similar to clutch mechanism 34 at the other end of the shaft 21 so that the follower 7 may be controlled independently of the distributing mechanism as may be desirable.

Having thus described the invention, what I claim as new and desire to secure by Letters Patent is:—

In a straw spreader of the class described having a body, a casing at the rear of the body, said casing having an open top adapted to receive a beater, and comprising a pair of spaced side walls having straight upper and lower edges, and downwardly and forwardly curved rear edges, each terminating in an angularly offset depending portion, a downwardly and forwardly curved rear wall terminating at its lower edge in an angularly offset depending flange, a rectangular bottom for said casing, said offset parts forming a grain pan at the bottom of the casing, and a screen interposed between said grain pan and said casing proper.

In testimony whereof I affix my signature.

WILLIAM C. ITZEN.